United States Patent [19]

Bachman

[11] 3,982,087

[45] Sept. 21, 1976

[54] LIQUID-LEVEL INDICATING MEANS
[75] Inventor: Albert J. Bachman, Bristol, Conn.
[73] Assignee: De Laval Turbine Inc., Princeton, N.J.
[22] Filed: Feb. 27, 1975
[21] Appl. No.: 553,508

[52] U.S. Cl. .............................. 200/84 C; 335/207
[51] Int. Cl.² ........................................ H01H 35/18
[58] Field of Search ........... 200/84 C; 335/205–207; 73/308, 313

[56] References Cited
UNITED STATES PATENTS

| 3,412,391 | 11/1968 | Ward | 335/207 |
| 3,537,047 | 10/1970 | Steiner | 335/207 |
| 3,781,498 | 12/1973 | Kamil et al. | 200/84 C |
| 3,790,912 | 2/1974 | Murphy | 335/205 |
| 3,826,139 | 7/1974 | Bachman | 200/84 C |

Primary Examiner—David Smith, Jr.
Attorney, Agent, or Firm—Hopgood, Calimafde, Kalil, Blaustein & Lieberman

[57] ABSTRACT

The invention contemplates position-indicating means particularly applicable to producing an electrical indication of liquid level and employing one or more magnetic-reed switches at a selected one or more fixed positions or levels to be monitored. The switches may be in longitudinally spaced array within a single elongate housing, for proximity response to the field of a magnetized actuator element as it assumes various longitudinal positions external to and along the housing. At each switch station, a magnetic-latch element, which is the means of magnetically actuating the switch contacts, has limited freedom of longitudinal displacement into and out of its region of switch actuation. At each station passage, the external actuator element is operative upon the adjacent magnetic-latch element to draw the latter through its limited displacement, and magnetic means are employed to retain the thus-displaced position of each latch element, whereby the closed or open conditions of the switch contacts remains, regardless of the extent to which the external actuator element is moved beyond its region of influence upon a particular latch element.

22 Claims, 6 Drawing Figures

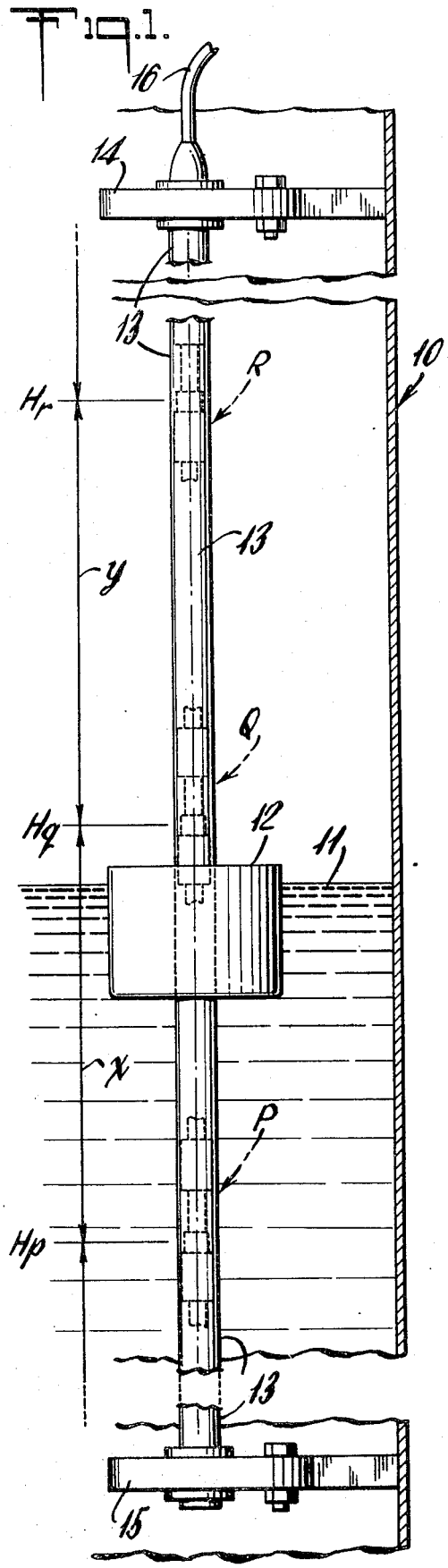
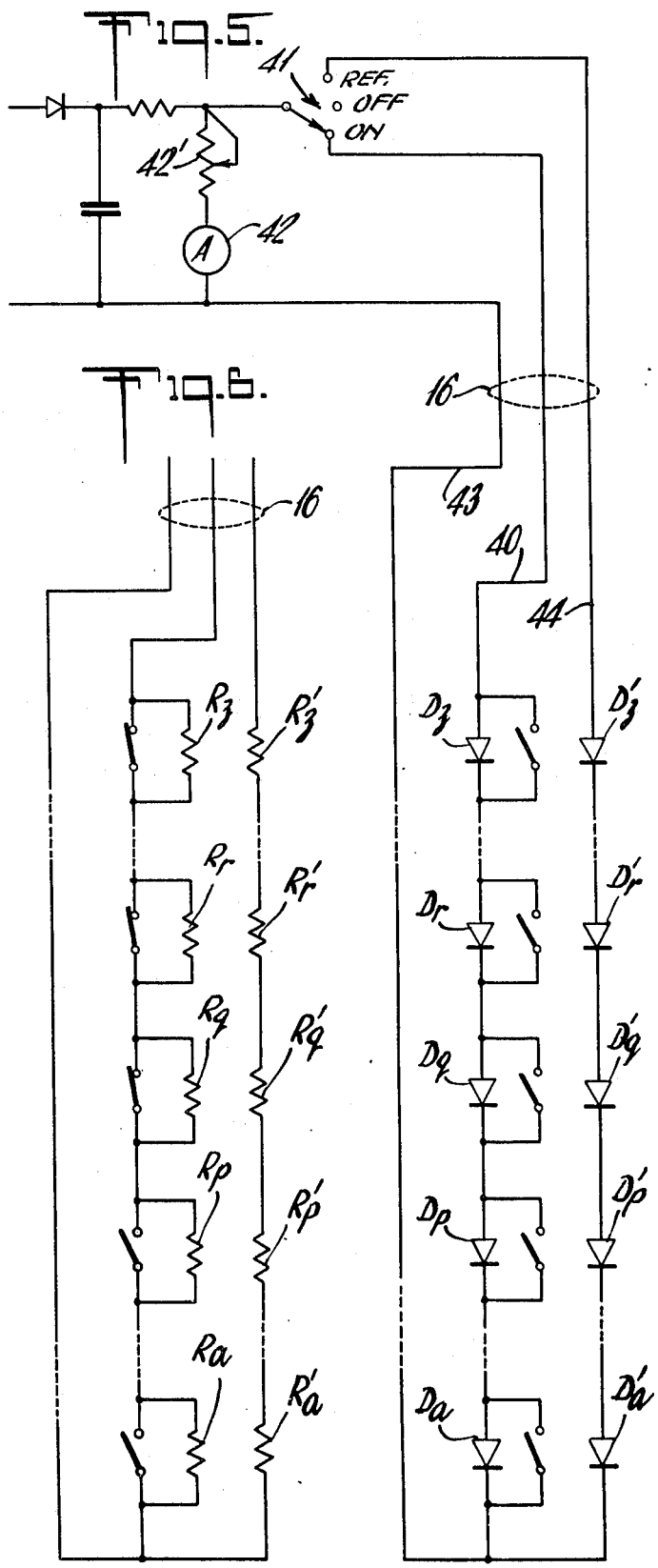

LIQUID-LEVEL INDICATING MEANS

This invention relates to position-responsive devices and systems wherein a magnetically responsive electric switch such as a magnetic-reed switch is relied upon to open or close an electric-circuit connection, for indicating or other purposes. The invention is particularly applicable to liquid-level response and will be described in detail in that connection.

Various techniques have been employed for sensing liquid level by means of magnetic-reed switches. In general, the switch is sealed and mounted within a vessel at each liquid level to be monitored, and a great number of specially connected magnetic-reed switches is required if a single float-borne external actuator magnet is to coact with the switches to monitor a variety of possible liquid levels in a given vessel.

It is an object of the invention to provide an improved device of the character indicated.

It is a specific object to provide a basic station arrangement of parts in conjunction with each of a plurality of spaced switches of the character indicated, whereby a single series-connection of the contacts of the plural switches enables precise electrical determination of liquid level.

Another specific object is to achieve the above objects with a reduced number of switches and electrical connections.

A further specific object is to achieve the above objects with a modular switch-station structure lending itself to flexibility as to longitudinal spacing between adjacent level-responsive stations.

It is also an object to provide a system meeting the above requirements and compatible for the measurement of the level of a single liquid or of the interface level between two liquids of different density in a given vessel.

Another object is to provide simple circuitry for accurate remote read-out of liquid-level data, the accuracy of such read-out being independent of changes in ambient temperature or voltage, vibration, shock or the like, and the circuitry lending itself to quick and reliable testing and calibration.

A general object is to meet the foregoing objects with simple, reliable and relatively low-cost structure.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

FIG. 1 is a fragmentary view of a liquid-storage tank equipped with liquid-level responsive means of the invention;

FIG. 5 is an electrical circuit diagram illustrative of one manner of interconnecting plural switches to provide an indication of instantaneous liquid level; and FIG. 6 is another circuit diagram to indicate a modification.

Figure 2:
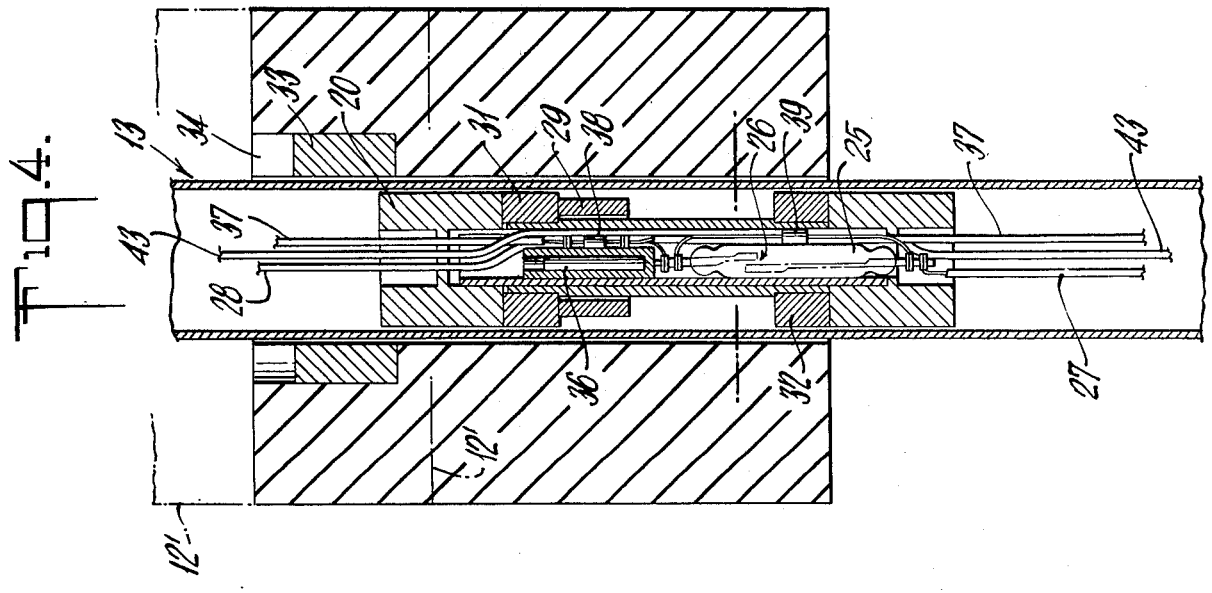
FIG. 2 is an enlarged vertical sectional view of level-responsive means at one station level in the structure of FIG. 1.

Referring to FIG. 1, the invention is shown in application to a tank or other vessel 10 for which the level of a liquid 11 is to be monitored, by magnetically tracking the position of a float 12. Float 12 is guided on a vertical tube or housing 13 for plural like magnetic response elements at stations P, Q, R, at elevations $H_p$, $H_q$, $H_r$ which are respectively spaced to the extents $x$ and $y$; $x$ and $y$ may or may not be equal, depending upon the desired read-out of detected level and its changes. Housing 13 may be suspended from an upper part of tank 10 or, as shown, it may be clamped in position by upper and lower brackets secured to the tank wall, as by means 14–15. Depending upon installation requirements, electrical connections to devices within housing 13 may be via a single end-connected flexible cable 16.

FIG. 2 shows detail of a station assembly at one of the stations P, Q, R, a duplicate of such an assembly being provided at each level-monitoring elevation. Each station assembly extends between cylindrical upper and lower base members 20–21, in self-piloted and axially stablized clearance relation with housing 13. Opposed end bores in the base members enable frictional telescoped assembly to a connecting tube 22, as well as later assembly to a lower spacer tube 23 of length say to accomplish the spacing $x$ (between stations P–Q) and to an upper spacer tube 24 of length say to accomplish the spacing $y$ (between stations Q–R). A magnetic-reed switch 25 is shown mounted within the lower end of tube 22, its contacts being shown closed at 26 to establish electrical connection between a flexible lower insulated conductor 27 and a corresponding similar upper conductor 28; the reason for contact closure at 26 is the operative proximity of an annular station-latching magnet 29. Magnet 29 is free to move along the tubular neck 30 of a subassembly, comprising upper and lower pole pieces 31–32 fitted to shoulders at reduced ends of the neck 30, and neck 30 pilots on the connecting tube 22. Float 12 is annular in order to pilot on housing 31, it may be of synthetic rubber selected for density (as related to the density of liquid for which level response is desired) such that a magnetized ring 33 secured in an upper counterbore 34 establishes a liquid level plane 35 through ring 33, under floating conditions. At the instant depicted in FIG. 2, the float magnet 33 has yet to rise into such proximity with the latching magnet 29 as to effect any switch operation other than the fully closed position shown. Thus, for a completely empty tank, with float magnet 33 at least beneath the lowest latching magnet 29, the switches 25 at each of the various plural elevations P, Q, R are all in closed condition.

Before describing the manner of actuating switch 25 to open condition, and then back again to closed condition, some observations will be made as to the magnetic and non-magnetic properties of certain parts. The housing 13 and tubes 22–30 are all non-magnetic, as of aluminum; and base members 20–21, may be non-magnetic, as of aluminum or molded plastic. Switch 25 and other parts contained in tube 22 are preferably potted in place by a material having no magnetic flux-conducting properties; among these parts is a rod 36 of magnetic flux-conducting material in preferably at least some axial overlap with pole piece 31; rod 36 projects downwardly to a point short of influence upon switch 25 and at least to the axial extent of the latching element 29. Magnet 36 is shown offset to one side of the central axis of symmetry, to provide clearance for insulated-conductor and circuit elements to be described. The parts 29–31–32–33–36 are all of magnetic flux-conducting material; and of these parts, at least rings 29–33 are permanently magnetized, preferably in opposite axial directions of the housing 13, although operation according to the invention is possible for other permanently magnetized combinations of these parts.

It will be understood that each of the cantilevered arms for the contacts of switch 25 is of stiffly compliant magnetic flux-conducting material, so mounted that, in the absence of any prevailing externally applied magnetic field of sufficient magnitude, the contacts of switch 25 are separated, to establish the open condition of the switch. In FIG. 2, however, the permanently magnetized presence of latching magnet 29 is such as to cause a substantial toroidal circulation of flux, say axially downward for the length of magnet 29, further axially downward and radially inwardly via pole piece 32, and then upward along both switch-contact arms until substantially the end of overlap of magnet 29 therewith. This circumstance establishes opposite poles at any open contacts at 26, thus promptly driving them into and retaining them in the closed relationship shown in FIG. 2.

Figure 3:
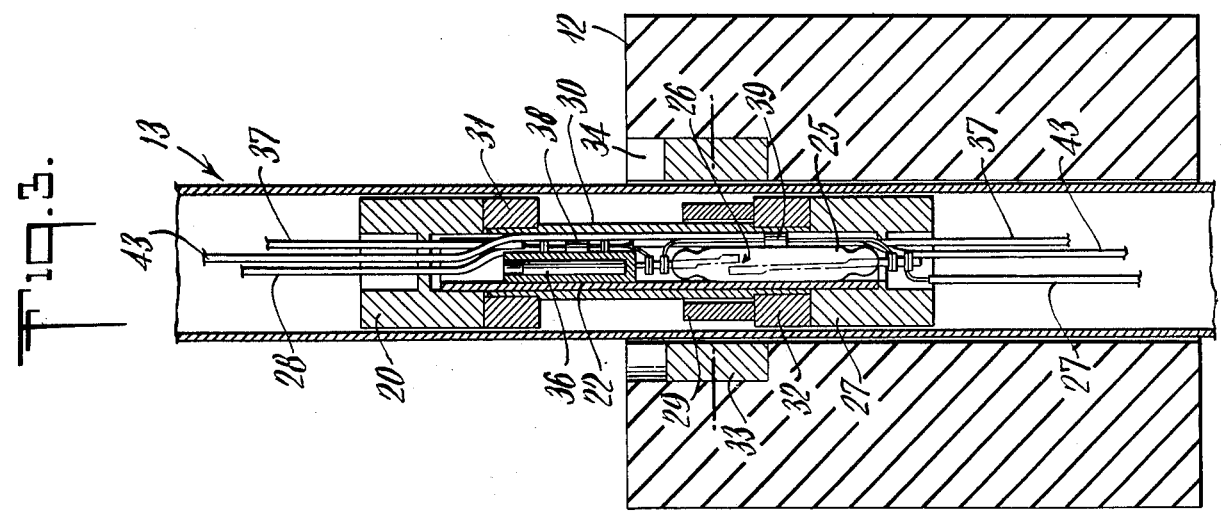
FIGS. 3 and 4 are views similar to FIG. 2, showing progressive changes in the relation of parts, in operation of the invention.

FIG. 3 illustrates the onset of influence of the float magnet 33 upon switch 25. This is substantially the instant at which the greater flux-carrying capacity of the float magnet 33 dominates, toroidal flux circulation being in one axial direction in magnet 33 and in the opposite axial direction in the latching magnet 29. This circumstance starves the switch-contact arms of any further participation in the earlier noted toroidal flux flow within the latching magnet 29, thus neutralizing the operative hold of the latching magnet 29 upon the switch contacts, so that the contacts open, as shown in FIG. 3.

So strong is the axially-overlapping hold of magnet 33 upon the latching magnet 29 that I choose to call magnet 33 an actuating magnet. Further upward displacement of magnet 33 carries the firm insistence that the latching magnet 29 shall follow or track such displacement, if at all possible, so that magnet 29 is lifted off pole piece 32 and is upwardly displaced until intercepted by mechanical abutment at the upper pole piece 31. During the entire time that latching magnet 29 was being displaced upwardly, its ability to or potentiality for accommodating an axially central division of toroidal flux flow was neutralized by the dominating presence of the float magnet 33. Thus, at no time after the contact-opening depicted in FIG. 3, and under rising liquid-level conditions, was there any operative force or magnetic field to disturb the open-contact condition shown at 26 in FIG. 3.

Figure 4:
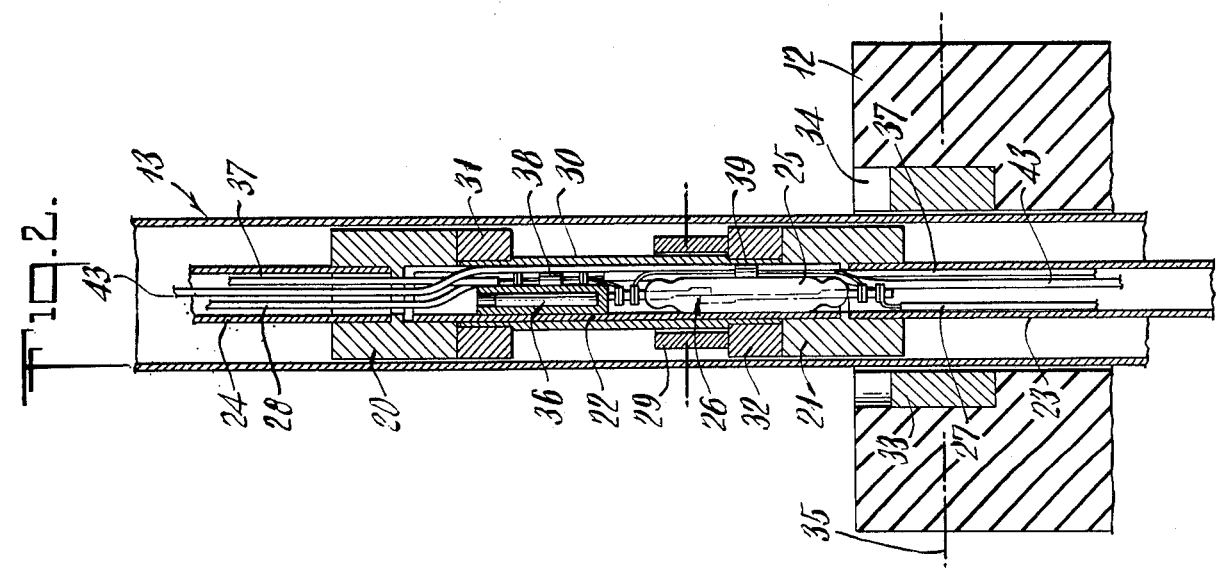

With further rising liquid-level conditions, the float magnet 33 proceeds upward beyond its region of influence upon the latching magnet 29 (the FIG. 4 situation). However, with magnet 29 abutted to pole piece 31, the magnet rod 36 offers its flux-conducting properties for the establishment of a toroidal flux path which involves central flow in rod 36 and outer flow in magnet 29 and pole piece 31. The flux flow in this toroidal path is sufficiently greater than if there were no central flux-conducting material, for the "up" or latched position of magnet 29, that magnet 29 is securely held in the up position, in spite of mechanical shock, until such time as the liquid level drops and permits the float magnet 33 to dominate the participation of latching magnet 29 in a toroidal flow of flux which is effectively exclusive of rod 36. Frther downward travel of float 12 brings latching ring 29 back into abutment at the lower pole piece 32, and switch contacts can again close at 26 when float-magnet dominance wanes, upon further descent of the float magnet.

FIG. 5 is an electrical diagram schematically illustrating a preferred technique for interconnecting switches 25 and other electrical components of the various station assemblies in housing 13. According to this technique, like diodes D are provided, two for each station. Such diodes are designated by subscript, consistent with notation already adopted in FIG. 1. In a first or level-indicating circuit arm 40, selected by means 41 forming part of a measurement device which includes a meter indicator at 42, each of the diodes $D_z \ldots D_r$, $D_q$, $D_p \ldots D_a$ is connected in shunt across the reed switch 25 for the station designated by subscript; in FIG. 2, this diode is designated 39. These shunt-connected diodes and switches establish a completed circuit via a return line 43 (shown in heavy black in FIG. 2) to the indicating means 42, the display at 42 being directly proportional to the number of diode resistances inserted in line 40 by reason of open switches; in FIG. 5, there are two such open switches, at stations A and P, the switches at all upper-level stations being closed to short-out all other diodes in line 40. It will be understood that for the instrumentation shown, a relatively high ohmic resistance 42' (e.g., 250,000 ohms, for the case of ten possible diodes in the line 40) associated with an ammeter at 42 will yield ten different clearly recognizable level indications at 42, depending upon whether and to what extent such diodes have been inserted in arm 40 by reason of open adjacent switches 25.

Also at each station level, in accordance with the invention, is a further like "reference" diode (38, in FIG. 2) which in FIG. 5 is given a corresponding but primed designation, e.g., $D_a'$ at level A, corresponding to diode $D_a$. All these further diodes are series-connected in another circuit arm 44, completed via return line 43 to display means 42, upon "REF." selection at 41, and in FIG. 2 the insulated flexible conductors 37 are the means of station-to-station series-connection of the diodes in arm 44. Such selection of arm 44 at 41 produces an immediate full-scale or full liquid-level reading at 42, enabling calibration-trimming of resistor 42' against the full-level inscription of meter 42, so that upon selection of arm 40 once more, it can be known that the display is correctly referenced to a calibrated "full" liquid level.

The modification of FIG. 6 is merely to demonstrate that the level-indicating circuit may include plural like resistor elements R, one for each station assembly, and electrically connected in shunt with its adjacent switch 25, as at 39 in FIG. 2. For this reason, the resistor elements R are given station-identifying subscript notation $R_a \ldots R_p$, $R_q$, $R_r \ldots R_z$; and a series-connected line of like resistors $R_a' \ldots R_p'$, $R_q'$, $R_r' \ldots R_z'$, each located at its particular station assembly, will be understood to serve a calibration function analogous to that described for line 44 in FIG. 5.

The described structure will be seen to have achieved all stated objects. It represents the essence of mechanical simplicity and involves no moving parts beyond the parasitically shuttled movement of the latching magnet as it does its best to stay with the downward or upward movement of the float magnet, should the float magnet traverse the particular station assembly; the only other mechanical movement involves contact-arm flexure within the sealed glass container that is conventional for a magnetic-reed switch, the elongate outline of such container being clearly displayed for switch 25 in FIG. 2. Each station subassembly is a complete modular unit, enabling simple assembly to such further units as may be desired for particular applications, and in such end-to-end proximity or spacing as may be required. Importantly, each level at which the float magnet is operative to produce a changed switch condition (a) requires only one switch and (b) remembers or retains the changes switch condition indefinitely, unless and until the float magnet returns, to return the switch to its earlier condition.

While the invention has been described in detail for the preferred forms and application shown, it will be understood that modifications and further applications may be made without departure from the invention. For example, by merely inverting the orientation of the float 12 in its application to housing 13 (thereby placing magnet 33 at the lower end of the inverted float, as suggested by phantom outline 12' in FIG. 4), and of course by proper choice of float density, float 12' may be caused to track the instantaneous level of an interface between liquids (e.g., oil and water) of different density in the same tank, the float density being selected to be intermediate the densities of the two liquids. Still further, it will be understood that the basic station assembly described in connection with FIG. 2 may be assembled in the vertical array described in connection with FIG. 1, but at a given critical liquid level (say, half-full level); such station assembly may be by-passed in the described electrical series-connections of FIGS. 5 and 6, thus leaving a station assembly electrically independent of the others, as for independent circuit connection to sound an alarm or illuminate a steady warning light as long as the critical level condition exists.

What is claimed is:

1. A magnetic-latching position-indicating transducer, comprising a magnetic-reed switch having contacts operable to open and close electric-circuit connections depending upon the presence or absence of a predetermined magnetic-field strength, an elongate non-magnetic tubular guide member encasing said switch near one to the exclusion of the other end thereof, an axially polarized annular magnetic latching element movably mounted upon said guide member and with respect to said switch over a displacement between a first position in actuating relation with said contacts to electrically close the same and a second position out of controlling relation with said contacts so as to electrically open the same, an annular pole-piece element of magnetic flux-conducting material carried at one end of said tubular guide member and fixedly positioned with respect to said switch and at said second position to coact with said latching element to magnetically restrain said latching element at said second position, an elongate non-magnetic tubular housing encasing said latching element and pole-piece element and guide member, and an axially polarized annular magnetic latch-actuating element guided by and movable along said tubular housing in the direction of said displacement and beyond the limits thereof, said latch-actuating element having a magnetic-field strength effectively exceeding that of said pole piece in terms of action upon said latching element, whereby displacement of said latch-actuating element between said positions is operative to determine the electrically open or closed condition of said contacts, and further whereby the electrically open condition of said contacts will be maintained by pole-piece retention of said latching element in its second position for such further displacements of said latch-actuating element as may occur away from said switch and beyond said second position.

2. The transducer of claim 1, in which a second annular pole-piece element of magnetic flux-conducting material is carried at the other end of said tubular guide member and is fixedly positioned adjacent said switch to magnetically restrain said latching element at said first position.

3. The transducer of claim 1, in which a mechanical abutment element is fixedly positioned adjacent said switch to arrest movement of said latching element at said first position.

4. The transducer of claim 1, in which said switch and said latching element and said pole-piece element constitute parts of one of a plurality of like stations at longitudinally spaced locations within said tubular housing, said latch-actuating element being axially movable over a span along said housing and embracing a plurality of said locations.

5. The transducer of claim 4, in which each of said stations includes an electric circuit element connected in shunt across the contacts of the adjacent switch.

6. The transducer of claim 5, in which the contacts of the switches of adjacent stations are electrically connected in series.

7. The transducer of claim 4, in which said circuit elements are resistors.

8. The transducer of claim 4, in which said circuit elements are diodes.

9. The transducer of claim 4, in which at each of said stations the shunt-connected circuit element is one of two like circuit elements, the second circuit elements at said station being series-connected with each other in a circuit arm.

10. The transducer of claim 9, in which said circuit elements are diodes.

11. As an article of manufacture, a unitary magnetically latchable electric-switch assembly, comprising an elongated tubular member of non-magnetic material, an elongate magnetic-reed switch fixedly mounted within said tubular member near one end thereof, two spaced annular pole pieces surrounding and carried at the ends of said tubular member, and an axially polarized annular latching magnet surrounding and slidably guided by said tubular member between a switch-open longitudinal position near one pole piece and a switch-closed longitudinal position near the other pole piece.

12. The assembly of claim 11, in which said pole pieces are characterized by like circular outer diameters for axially stabilized piloting on the inner wall of a tubular casing, said latching magnet being annular and having radial clearance with said tubular member and with the projected geometric outer cylinder defined by and between said pole pieces.

13. The assembly of claim 11, and including an elongate polarized magnet member contained within said tubular member near the other end thereof and at least in partial axis overlap with the adjacent pole piece, the axial direction of polarization of said magnet member being opposed to that of said latching magnet, whereby said latching magnet is restrained at the switch-open position of axial overlap with said magnet member and of adjacency to said one pole piece by self-promotion of a toroidal polarized flux path via said one pole piece.

14. Liquid-level measuring apparatus, comprising an elongate tubular housing of non-magnetic material, plural station assemblies contained within said housing at longitudinally spaced level spacings to be monitored, each station assembly comprising a tubular core member with spaced annular magnetic pole pieces carried at the ends of said core and having axially stabilized self-piloting relation with the inner wall of said housing, a tubular spacer member maintaining a predetermined axial spacing between adjacent station assemblies, each station assembly further comprising an axially polarized annular latching magnet surrounding said core and guided for longitudinal displacement between abutment limits at said pole pieces, a magnetic-reed switch mounted within said core in overlap with a portion only of the path of movement of said latching magnet and near one to to the exclusion of the other of said pole pieces, electric-conductor means confined within said tubular members and serially connecting said switches to establish a first elongate line, like circuit-element means at each of said station assemblies connected in electrical shunt across the contacts of the adjacent switch, whereby the impedance of said line will be a reflection of the closed or open condition of one or more switches in the line, and a float element including an axially polarized annular magnet member external to and movable along said housing.

15. Apparatus according to claim 14, in which said circuit-element means comprises a diode at each station assembly.

16. Apparatus according to claim 14, in which said circuit-element means comprises a resistor at each station assembly.

17. Apparatus according to claim 14, in which a return conductor passes through all tubular members, one end of said housing being closed by a single cable connection to said conductors.

18. Apparatus according to claim 15, in which said diode is one of two like diodes at each station assembly, and second electric-conductor means extending within said tubular members and serially interconnected to second diodes of each station and independently of switches.

19. Apparatus according to claim 18, and including indicating-instrument means with selectively operable means for electrically connecting said instrument means to one or the other of the serially connected lines in said housing.

20. Apparatus according to claim 14, in which an elongate magnet element is mounted within said core member in spaced relation to said switch and in overlap with a portion only of the path of movement of said latching magnet and near the other of said pole pieces to the exclusion of said one pole piece.

21. The transducer of claim 9, in which said circuit elements are resistors.

22. The transducer of claim 1, wherein an elongate core member of magnetic flux conducting material is fixed carried within said tubular guide member in overlap with said pole-piece element and extending in the direction of said switch, whereby when said latching element is in said second position, the flux path attributable to polarization of said latching element is toroidally completed primarily through said core member and said pole piece.

* * * * *